United States Patent [19]

Akkapeddi et al.

[11] Patent Number: 5,391,640
[45] Date of Patent: Feb. 21, 1995

[54] MISCIBLE THERMOPLASTIC POLYMERIC BLEND COMPOSITIONS CONTAINING POLYAMIDE/AMORPHOUS POLYAMIDE BLENDS

[75] Inventors: Murali K. Akkapeddi; Jeffrey H. Glans, both of Morristown, N.J.; Jerome F. Parmer, Mt. Prospect, Ill.

[73] Assignee: AlliedSignal Inc., Morris Township, Morris County, N.J.

[21] Appl. No.: 169,719

[22] Filed: Dec. 17, 1993

Related U.S. Application Data

[63] Continuation of Ser. No. 868,602, Apr. 14, 1992, abandoned.

[51] Int. Cl.$^6$ ............................................. C08L 77/00
[52] U.S. Cl. ................................... 525/432; 528/324; 528/339
[58] Field of Search ................ 525/432; 528/339, 324

[56] References Cited

U.S. PATENT DOCUMENTS

| | | | |
|---|---|---|---|
| 4,014,957 | 3/1977 | Kirsch et al. | 260/857 |
| 4,278,779 | 7/1981 | Nakagawa | 525/432 |
| 4,467,011 | 8/1984 | Brooks et al. | 428/245 |
| 4,788,248 | 11/1988 | Maresca et al. | 525/66 |
| 4,788,249 | 11/1988 | Maresca et al. | 525/66 |
| 4,826,955 | 5/1989 | Akkapeddi | 528/324 |
| 4,952,628 | 8/1990 | Blatz | 525/58 |
| 4,983,719 | 1/1991 | Fox et al. | 528/339 |
| 5,250,604 | 10/1993 | Moriwaki et al. | 525/432 |
| 5,268,219 | 12/1993 | Harada et al. | 428/220 |

FOREIGN PATENT DOCUMENTS

| | | |
|---|---|---|
| 288972A2 | 11/1988 | European Pat. Off. . |
| WO9113113 | 9/1991 | European Pat. Off. . |
| 475720A2 | 3/1992 | European Pat. Off. . |
| 4023863 | 1/1992 | Japan . |

OTHER PUBLICATIONS

Hackh's Chem. Dictionary, Third Ed. McGraw-Hill Inc. New York 1944 pp. 671 and 71.
"The Effect of Structure Upon the Oxygen Permeation Properties of Amorphous Polyamides" T. D. Krizan et al.
"Miscibility in blends of aliphatic polyamides and an aromatic polyamide, nylon 3Me6T"–T. S. Ellis.

Primary Examiner—James J. Seidleck
Assistant Examiner—I. Zemel
Attorney, Agent, or Firm—Melanie L. Brown; Roger H. Criss

[57] ABSTRACT

Thermoplastic polymeric composition which feature good physical properties which are relatively insensitive to humidity and further exhibits good barrier properties of the composition comprise:
(A) a first conventional polyamide, and
(B) an amorphous copolyamide which is polymerized from
($B_1$) a polyamide forming monomer selected from the group consisting of lactams, aminoalkanoic acids and mixture thereof wherein the monomer is present in a molar proportion of between about 0 and 50%,
($B_2$) a diamine selected from the group consisting of aralkylene diamines, cycloalkylene diamines and mixtures thereof, the diamine being present in a molar proportion of between about 25 and 60%,
($B_3$) a dicarboxylic acid selected from the group of an aromatic dicarboxylic acid, aralkylene dicarboxylic acids, and aliphatic dicarboxylic acids; preferably the use of an aliphatic dicarboxylic acid in conjunction with an aromatic dicarboxylic acid is preferred, at least one aromatic diacid, the dicarboxylic acid being present in a molar proportion of between about 25 and 60%, wherein the (A) and (B) are substantially miscible when formed into a blend composition.

The blend composition finds use as a molding composition, as well as a film forming composition, alternately, may be formed into a variety of articles which exhibit improved physical properties.

25 Claims, No Drawings

MISCIBLE THERMOPLASTIC POLYMERIC BLEND COMPOSITIONS CONTAINING POLYAMIDE/AMORPHOUS POLYAMIDE BLENDS

This application is a continuation of application Ser. No. 868,602, filed Apr. 14, 1992, now abandoned.

BACKGROUND

1. Field of the Invention

The present invention relates to thermoplastic polymeric molding compositions; more particularly the present invention is related to miscible thermoplastic polymeric blend compositions comprising at least one polyamide, and at least one amorphous polyamide composition wherein the molding composition may be characterized as having good gas barrier properties, and/or good physical strength characteristics, even under conditions of high humidity.

2. Description of the Prior Art

As is known, there are exant a multitude of moldable thermoplastic compositions which comprise a polyamide. Polyamides are desirable engineering materials due to their excellent strength characteristics including impact strength and wear resistance which results from high crystallinity of such materials. They are readily processable and formable into a variety of articles and shapes, and which are readily available. However, polyamides are also known to the art to be particularly sensitive to moisture absorption, such as might be occasioned during use in humid conditions or wherein an article is contacted with water, as a consequence of which appreciable degradation of many desirable physical properties of the polyamide are known to result. Further, polyamides are known to exhibit poor vapor barrier properties to such gases as oxygen, and of course, water vapor.

In order to overcome these shortcomings, the prior art is replete with improved moldable thermoplastic compositions which suggest a broad range of additional constituents which may be used in conjunction with a polyamide in order to achieve selected improvements in such compositions.

U.S. Pat. No. 4,952,628 to Blatz describes thermoplastic blend materials comprising about 50–95 weight percent of an amorphous polyamide with about 5–50 weight percent of a copolymerized ethylene/vinyl alcohol polymer having an ethylene content of between 0–60%. The blend materials taught by Blatz feature physical properties such as reduced sensitivity to humidity, and improved barrier properties. The blends taught therein provide films and film layers within rigid packaging structures which feature good vapor barrier characteristics.

U.S. Pat. No. 4,983,719 to Fox et al. provides an amorphous polyamide composition which is a reaction product of a paraxylylene diamine, adipic acid and isophthalic acid; the polyamide composition features excellent oxygen barrier characteristics and finds particular use as a container layer in rigid food packaging structures.

U.S. Pat. No. 4,467,011 to Brooks et al. provides injection moldable compositions useful in forming laminates for films and rigid structures which include an amorphous polyamide and polyamide-imide copolymers. The compositions are particularly useful in forming coatings for glass fibers.

U.S. Pat. Nos. 4,788,248 and 4,788,249 to Maresca et al. provides thermoplastic resin blends which comprise a polyamide, a resin which may be a polycarbonate, polyester carbonate, or polyarylate, a compatibilizing copolymer of polyamide-polyester, and optionally a rubbery impact modifier. The compositions may include an amorphous polyamide which is derived from hexamethylene diamine and mixtures of terepthalic acid and isopthalic acid.

U.S. Pat. No. 4,014,967 to Kirsch et al. provides thermoplastic polyamide molding compositions which include at least one amorphous linear polyamide, and at least one segmented thermoplastic elastomeric copolyester; the elastomeric copolyester consist essentially of a large number of repeating intralinear long chain and short chain ester units linked head-to-tail via ester linkages wherein both the long chain and short chain ester linkages are of a particular structure.

U.S. Pat. No. 4,826,955 to Akkapeddi et al. provides an article of manufacture which comprises at least one barrier layer of an amorphous nylon copolymer.

PCT International Application WO 91/13113 to Exxon Chemical Patents Inc. provides oxygen barrier structures comprising polyoxamides or copoly(amide-oxamide)s which may be derived from a reaction between one or more diamines and oxalic acid, or derivative thereof. In Example 7 of that reference are discussed the copoly(amide-oxamide), nylon-MXD2/MXD6. The oxygen barrier layers find particular use in coextruded structures such a films.

Various other resins featuring reduced barrier characteristics may be found in "The Effect of Structure Upon the Oxygen Permeation Properties of Amorphous Polyamide" by TD Krizan, JC Coburn and PS Blatz, Polymer Preprints, 30, 9 (1989), which discusses blends of nylon 66, and a poly(hexamethylene isophthalamide/terepthalamide) resin. Further, in an article titled "Miscibility in blends of aliphatic polyamides and aromatic polyamide, nylon 3Me6T" by TS Ellis, published in POLYMER, 1988, Vol.29, (November), blends of nylon 6 and an amorphous aromatic polyamide, nylon 3Me6T, a condensation product of dimethyl terephthalate and 2,2,4-trimethyl-1,6-hexanediamine, and are discussed, and various nylons are discussed.

While these compositions provide useful thermoplastic compositions which find utility in the art, there nonetheless remains a real and continuing need for improved thermoplastic molding compositions which feature good physical characteristics, good vapor barrier properties and good processability.

SUMMARY

The present invention provides thermoplastic polymeric compositions comprising:

(A) a first conventional polyamide, and (B) an amorphous polyamide which is polymerized from ($B_1$) a polyamide forming monomer selected from the group consisting of lactams, aminoalkanoic acids and mixture thereof wherein the monomer is present in a molar proportion of between about 0 and 50%, ($B_2$) a diamine selected from the group consisting of di(aminoalkyl)benzenes, di(aminoalkyl)halobenzenes, di(amino)alkylbenzenes, di(alkylaminobenzenes), cycloalkylene diamines and mixtures thereof, the diamine being present in a molar proportion of between about 25 and 60%, (B3) a dicarboxylic acid selected from the group of an aromatic dicarboxylic acid, aralkylene dicarboxylic acids, and aliphatic dicarboxylic acids; preferably the use of an aliphatic dicarboxylic acid in conjunction with an aromatic dicarboxylic acid is preferred, at least one aromatic diacid, the dicarboxylic acid being present in a molar proportion of between about 25 and 60%, wherein the (A) and (B) are substantially miscible when formed into a blend composition which exhibits good physical properties which are relatively insensitive to humidity and further exhibits good barrier properties of the composition. The blend composition finds use as a molding composition, as well as a film forming composition.

The compositions of the present invention may further optionally comprise:

(C) conventional additives and processing aids which are known to the art which include but are not limited to: heat stabilizers, processing agents, lubricants, mold release agents, ultraviolet stabilizers, organic dyes and pigments, inorganic reinforcing materials, and plasticizing agents.

In a further aspect of the invention there is provided a thermoplastic polymeric molding composition as outlined above which features a glass transition temperature (sometimes hereinafter interchangeably referred to as "Tg") which is higher than that of the conventional polyamide constituent (A) and is preferably equal to or in excess of 100° C. as compared under like conditions, indicating a substantial degree of miscibility of the constituents of the blend composition.

In a yet further aspect of the invention there is provided a process for forming a thermoplastic polymeric molding composition which comprises at least the (A) conventional polyamide constituent and the (B) amorphous polyamide constituent described above.

In a still further aspect of the invention there is provided a plurality of articles including films, molded articles, profiled shapes, as well as articles comprising a layer of the composition in their construction.

DESCRIPTION OF THE PREFERRED EMBODIMENTS

The present invention provides thermoplastic polymeric molding compositions comprising (A) a first conventional polyamide, and
(B) an amorphous polyamide which is polymerized from (B1) a polyamide forming monomer selected from the group consisting of lactams, aminoalkanoic acids and mixture thereof wherein the monomer is present in a molar proportion of between about 0 and 50%, (B2) a diamine selected from the group consisting of aralkylene diamines, cycloalkylene diamines and mixtures thereof, the diamine being present in a molar proportion of between about 25 and 60%, (B3) a dicarboxylic acid selected from the group of an aromatic dicarboxylic acid, aralkylene dicarboxylic acids, and aliphatic dicarboxylic acids; preferably the use of an aliphatic dicarboxylic acid in conjunction with an aromatic dicarboxylic acid is preferred, at least one aromatic diacid, the dicarboxylic acid being present in a molar proportion of between about 25 and 60%.

The compositions of the present invention may optionally further include (C) conventional additives and processing aids which are known to the art which include but are not limited to: heat stabilizers, processing agents, lubricants, mold release agents, ultraviolet stabilizers, organic dyes and pigments, inorganic reinforcing materials, and plasticizing agents.

Polyamides suitable for use with the instant invention and which are considered to be the conventional polyamides (A) in accordance with the present teaching include the long chain polymeric amides having recurring amide groups as part of the polymer backbone and preferably, have a number average molecular weight as measured by end group titration of about 15,000 to 40,000. The polyamides suitable for use herein can be produced by any conventional means known to the art.

Conventional polyamides (A) which find use in accordance with the present invention include those which may be obtained by the polymerization of equimolar proportions of a diamine having two or more carbon atoms between the amine terminal groups with a dicarboxylic acid, or alternately that obtained by the polymerization of a monoamino carboxylic acid or an internal lactam thereof with an equimolar proportion of a diamine and a dicarboxylic acid. Further, suitable polyamides may be derived by the condensation of a monoaminocarboxylic acid or an internal lactam thereof having at least two carbon atoms between the amino and the carboxylic acid groups, as well as other means. General procedures useful for the preparation of polyamides are well known to the art, and the details of their formation are well described under the heading "Polyamides" in the Encyclopedia of Polymer Science and Technology, published by John Wiley & Sons, Inc, Vol. 10, pps.487–491, (1969).

Suitable diamines include those having the formula

$$H_2N(CH_2)_nNH_2$$

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4-trimethylpentamethylenediamine, as well as cycloaliphatic diamines, such as diaminodicyclohexylmethane, and other compounds.

The dicarboxylic acids useful in the formation of polyamides are preferably those which are represented by the general formula

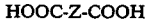

$$HOOC\text{-}Z\text{-}COOH$$

wherein Z is representative of a divalent aliphatic radical containing at least 2 carbon-atoms, such as adipic acid, sebacic acid, octadecanedioic acid, pimelic acid, subeic acid, azelaic acid, undecanedioic acid, and glutaric acid. The dicarboxylic acids may be aliphatic acids, or aromatic acids, such as isophtalic acid and terephthalic acid.

By means of example, suitable polyamides include: polypyrrolidone (nylon 4), polycaprolactam (nylon 6), polyheptanolactam (nylon 7), polycaprylactam (nylon 8), polynonanolactam (nylon 9), polyundecaneolactam (nylon 11), polydodecanolactam (nylon 12), poly(tetramethylenediamine-co-oxalic acid) (nylon 4,2), poly(tetramethylenediamine-co-adipic acid) (nylon 4,6), poly(tetramethylenediamine-co-isophthalic acid) (nylon 4,I), polyhexamethylene azelaiamide (nylon 6,9), polyhexamethylene sebacamide (nylon 6,10), polyhexamethylene isophthalamide (nylon 6,IP), polymetaxylylene adipamide (nylon MXD6), the polyamide of n-dodecanedioic acid and hexamethylenediamine (nylon 6,12), the polyamide of dodecamethylenediamine and n-dodecanedioic acid (nylon 12,12), as well as copolymers thereof which include: hexamethylene adipamide-caprolactam (nylon 6,6/6), hexamethylene adipamide/hexamethylene-isophthalamide (nylon 6,6/6IP), hexamethylene adipamide/hexamethylene-terephthalamide (nylon 6,6/6T), trimethylene adipamide-hexamethylene-azelaicamide (nylon trimethyl 6,2/6,2), and hexamethylene adipamide-hexamethylene-azelaicamide caprolactam (nylon 6,6/6,9/6) as well as others which are not particularly delineated here.

Of these, the preferred conventional polyamides include polyhexamethylene adipamide (nylon 12) and polycaprolactam (nylon 6).

The (B) amorphous polyamide which which forms a second essential constituent of the present invention is at least one which is is polymerized from ($B_1$) a polyamide forming monomer selected from the group consisting of lactams, aminoalkanoic acids and mixture thereof wherein the monomer is present in a molar proportion of between about 0 and 50%, ($B_2$) a diamine selected from the group consisting of aralkylene diamines, cycloalkylene diamines and mixtures thereof, the diamine being present in a molar proportion of between about 25 and 60%, ($B_3$) an acid selected from the group of aromatic dicarboxylic acids, aralkylene dicarboxylic acids, and aliphatic dicarboxylic acids. It is preferred that an aromatic dicarboxylic acid in conjunction with an aliphatic dicarboxylic acid be used. The acid $B_3$ being present in a molar proportion of between about 25 and 60%.

These materials and methods for their production are particularly described in U.S. Pat. No. 4,826,955 the contents of which are wholly incorporated by reference.

The amorphous polyamide (B) may generally be represented by the following formula:

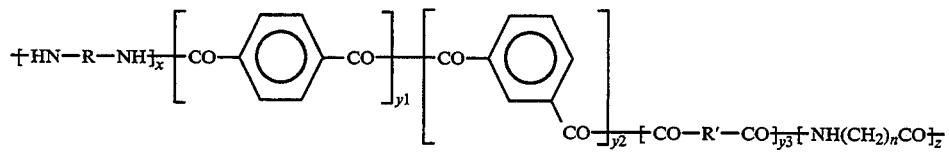

wherein;
the subscripts to the parenthesis in the equation are representative of mole fractions of each of the indicated segments of the amorphous copolyamide (B) such that:

$$x+y1+y2+y3+z=1 \quad \text{[Eq. 1]}$$

and $$y1+y2+y3=x \quad \text{[Eq. 2]}$$

and wherein n has a value of 5–11, and z=0–0.5. The constituent R in the structure above may be any one or more of the following:

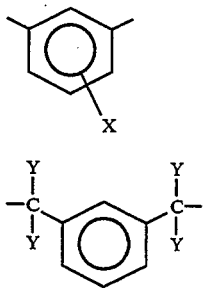

X may be —$CH_3$, an n-alkyl group, or a halide such as —Cl,
y may be H or —$CH_3$,
R' is an α,ω-alkylene radical containing 4 to 18 carbon atoms particularly including those derived from adipic acid, azelaic acid, sebacic acid and dodecanedioic acid.

The polyamide forming monomer ($B_1$) is at least one monomer selected from the group consisting of: lactams, aminoalkanoic acids. Exemplary materials include the $C_5$–$C_{12}$ lactams as well as their corresponding aminoalkanoic acids such as caprolactam, lauroyllactam, ε-aminocaproic acid, ω-aminolauric acid, 11-aminoundecanoic acid, 12-aminododecanoic acid, aminomethylbenzoic acid, and the like. Mixtures of two or more of the above are also contemplated. Of these, the preferred monomer is caprolactam.

The diamine ($B_2$) is one or more diamines selected from the group consisting of aralkylene diamines, and cycloalkylene diamines.

Exemplary diamines ($B_2$) include aralkyldiamines, as well as mixtures thereof. Such diamines include but are not limited to:
m-bis-(aminoalkyl)benzenes:
p-bis-(aminoalkyl)benzenes: such as m-xylylene diamine and p-xylylene diamine, as well as mixtures thereof,
m-bis-(aminoethyl)benzene:
p-bis-(aminoethyl)benzene:
2,4-bis-(aminomethyl) chlorobenzene and the like. Exemplary diamines ($B_2$) further include aromatic diamines such as toluene-2,4-diamine (which may optionally include minor amounts of toluene 2,6-diamine), 4,4'-methylenedianiline, 4,4'-oxydianiline, 4,4,'-sulfonyldianiline, 3,3'-dimethyl-4,4'-methylene, dianiline.

Additionally, it is contemplated that in the place of aromatic diamines discussed here that the corresponding diisocyanates may also be used as a monomer constituent for ($B_2$).

It is further contemplated that in the place of the aromatic diacides discussed here that polyoxamides or copoly(amide-oxamides) may be utilized as the monomer constituent for ($B_3$). Such polyoxamides are the reaction product of oxalic acid, or derivative thereof with at least one diamine by conventional techniques, including melt, interfacial or solution polymerization techniques. Polyoxamides which may be used include: poly(ethylene oxamide), poly(trimethylene oxamide), poly(tetra-methylene oxamide), poly(pentamethylene oxamide), poly(hexamethylene oxamide, poly(heptamethylene oxamide), poly(octamethylene oxamide), poly(nonamethylene oxamide), poly(decamethylene oxamide), poly(dodecamethylene oxamide), poly(hexamethylene/octamethylene oxamide), poly(hexamethylene/decamethylene oxamide), poly(hexamethylene/trimethylhexamethylene oxamide), as well as poly(m-xylylene oxamide).

Copoly(amide-oxamides), which find use include those which are the reaction product of at least one diamine with oxalic acid or derivative thereof and further, at least one or more dicarboxylic acids; or the reaction of one or more monoaminomonocarboxylic acids or derivatives or lactams thereof, with one or more diamines and oxalic acid, and optionally, one or more dicarboxylic acids. The copoly(amide-oxamides) may be formed by conventional techniques including melt, interfacial or solution polymerization techniques. The copoly(amide-oxamide) may be random, block, or regularly alternating type copolymers.

Specific copoly(amide-oxamides) which may be used in the practice of the present invention include poly(hexamethylene oxamide/azelamide), poly(hexamethylene oxamide/sebacamide), poly(hexamethylene oxamide/isophthalamide), poly(hexamethylene oxamide, terepthalamide), poly(mxylylene oxamide/m-xylylene adipamide), as well as others, including those described in PCT/US91/01083.

Particularly preferred diamines ($B_2$) include: m-xylylene diamine (sometimes interchangeably referred to as "MXDA"), poly(m-xylylene oxamide/m-xylylene adipamide) (sometimes interchangeably referred to as "nylon-MXD2/MXD6"), p-xylylene diamine (sometimes interchangeably referred to as "PXDA"), bis-(p-aminocyclohexyl) methane (sometimes interchangeably referred to herein as "PACM"), 1,3-bis-(aminomethyl) cyclohexane, and, 1-methyl 2,4-diaminocyclohexane. The most preferred diamine ($B_2$) is MXDA which may comprise some of the para isomer.

It is to be understood that mixtures or two or more of the above diamines or other suitable constituents described above may be used as the diamine constituent ($B_2$).

A further essential constituent ($B_3$) is at least one aromatic diacid including aromatic dicarboxylic acids having 7 to 20 carbon atoms, including
terepthalic acid (interchangeably referred to as "TPA"),
isophthalic acid (interchangeably referred to as "IPA"),
t-butylisophthalic acid,
3-(4-carboxyphenyl-1,1,3-trimethyl-5-indan carboxylic acid (interchangeably referred to as "PIDA"), and which is also known as phenylindane dicarboxylic acid, or more broadly simply as a phenyline diacid, 2,6-naphthaltene-dicarboxylic acid, and the like.

Further, the ester derivative of the diacid may be used in place of or in conjunction with its corresponding diacid, i.e., diphenyl or dimethyl terepthalate may be used in the stead of TPA; hence, the diacid ($B_3$) is also to be understood to include such ester derivatives.

Mixtures of two or more of the above diacids and/or ester derivatives are contemplated as useful in forming the diacid ($B_3$).

Preferably, the diacid ($B_3$) include mixtures of IPA, TPA, and PIDA, and most preferably include mixtures of terepthalic acid and isophthalic acid.

The ($B_1$), ($B_2$) and ($B_3$) constituents may be present in an approximate molar proportion of ($B_1$):($B_2$):($B_3$) of 0–50%:25–60%:25–60%. Preferably the approximate molar ratios are within the proportions of 20–50%:30–50%:30–50%. Most preferably the approximate molar ratios of these constituents are within the respective molar proportions of 30–40%:30–40%:30–40%. It is further preferred that approximately equal molar amounts of ($B_2$) and ($B_3$) be used.

The present inventors have found that if component ($B_1$) is present in an amount greater than that described above, the resulting amorphous polyamide (B) features poor oxygen barrier resistance in humid environments. Poor oxygen barrier resistance in humid environments also results when $B_2$ and $B_3$ are present in amounts less than those outlined above.

The amorphous polymamide (B) may be any type of copolymer, such as a random copolymer, block copolymer, graft or "branched" copolymers, repeating copolymers and others not particularly described here.

The amorphous polyamide (B) may be produced by methods which are known to the art for the production of polyamides. For example, in the case of polymer formed from caprolatam, MXDA, IPA and TPA, all of the constituents may be charged to a reactor vessel followed by heating to an appropriate reaction temperature, generally approx. 200°–325° C., under a blanked of an inert gas such as nitrogen or argon. In an alternative method, in the case of copolymers formed from caprolatam, MXDA, IPA and TPA, the salt of MXDA and the salt of the IPA/TPA may be formed in situ and added as a preformed salt, followed by the addition of caprolactam. Water may be used as a solvent in the initial stages of the formation of the salts.

Further methods for the production of the amorphous polyamide (B) are more particularly detailed in commonly assigned U.S. Pat. No. 4,826,955, the contents of which are herein incorporated by reference.

The amorphous polyamide (B) according to the present invention is a transparent, amorphous polymer having a dry Tg of at least 100° C. but preferably in the range of 130° C.–290° C., and preferably further includes a "wet" Tg ("wet" being understood as 100% relative humidity) of at least 25° C., more preferably in excess of 40° C.

The amorphous polyamide (B) according to the invention has a reduced solution viscosity in m-cresol at 25° C. of at least about 0.5 dl/g, preferably between about 0.7 and 1.2 dl/g.

The thermoplastic polymeric molding compositions may comprise the conventional polyamide (A) and the amorphous polyamide (B) in any amount wherein there is realized by the composition an improvement in the modulus, yield stress and/or oxygen barrier properties, particularly when exposed under humid conditions, over the modulus, yield stress and/or oxygen barrier property of the conventional polyamide (A) under like conditions. Preferably, a thermoplastic polymeric molding composition comprises in terms of percentage by weight at least 5% (B). More preferably, an inventive composition comprises between 50–95% (A) and 5–50% (B).

An advantageous feature of the instant invention is that there are provided specific compositions which comprise conventional polyamides, particularly those known to the art as nylon 6 and nylon 66 (as well as mixtures and copolymers comprising the same) wherein certain shortcomings in the prior art are overcome. More particularly, the glass transition temperatures and the barrier properties of the conventional nylons are improved by the addition of the amorphous polyamide (B) taught herein and that such resultant thermoplastic molding composition is useful as a molding composition useful in the formation of articles therefrom. Further, such articles simultaneously feature excellent physical characteristics which are very similar to that of the conventional polyamide (A) constituent alone, under like conditions. This is particularly appreciable under conditions of relatively high humidity, i.e., 25% and greater relative humidity, particularly at conditions of 100% relative humidity; the inventive compositions exhibit reduced sensitivity to moisture and provide excellent barrier properties and good physical characteristics.

The inventor have surprisingly also found that the inventive compositions provide improvements in the yield stress and improvements in the barrier characteristics, especially under humid conditions, when even minor amounts of the amorphous polyamide (B) are included in the composition. Whereas one skilled in the art would expect that one might at best realize improvements in the various characteristics of a composition which would be directly proportional to the amount of the amorphous polyamide (B) relative to the amount of the conventional polyamide (A) included in a composition, it has been found that such a relationship is not realized. Rather, it has been found that significant improvements in the barrier properties, particularly at relatively high humidity and at 100% humidity are realized when amounts as little as 35% and even less of the amorphous polyamide (B) are included. The compositions also feature an increase in the melt temperature. This effect will be more particularly appreciated from the accompanying Examples presented below.

The thermoplastic molding compositions according to the present invention are produced by conventional means known to the art of the production and processing of polyamide compositions. Blending or mixing of the constituents which comprise the composition may be by any effective means which will effect their uniform dispersion. All of the constituents may be mixed simultaneously or separately by a mixer, blender, kneader, roll, extruder, or the like in order to assure a uniform blend of the constituents. In the alternative, two or more but less than all of the constituents may be blended or mixed by mixer, blender, kneader, roll, extruder, or the like in order to assure a uniform blend of the constituents and the resultant mixture is melt-kneaded with the remaining constituents in an extruder to make a uniform blend. The most common method is to melt-knead a previously dry-blended composition further in a heated extruder provided with a single-screw, or in the alternative, a plurality of screws, extrude the uniform composition into strands extrude the uniform composition into strands, and subsequently chopping the extruded strands into pellets. The resulting molding composition may be subsequently provided to the feed hopper of a molding apparatus used for forming articles, or alternately, the molding composition may be stored.

The compositions according to the present invention may further include conventional additives and processing aids which are known to the art. Typically such conventional additives are added to the composition in a mixing step and are included in an extrudate of the composition.

Heat stabilizers and processing agents include those which are known to be useful in conjunction with thermoplastic compositions, and include halides of metals of Group I of the periodic table of elements, including but not limited to sodium halides, lithium halides, potassium halides as well as such halides in conjunctive use with copper halides. Further stabilizers include sterically hindered phenols, hydroquinones as well as derivatives thereof. Generally such stabilizers and processing agents comprise 5 weight percent or less of a total thermoplastic composition. Preferably such stabilizers and processing agents comprise 2.5 weight percent or less of a total thermoplastic composition.

Conventional lubricants and mold release agents which may be used include stearyl alcohol and fatty acid esters, including stearic esters. Generally such lubricants and mold release agents comprise 5 weight percent or less of a total thermoplastic composition, preferably they comprise 2.5 weight percent or less of a total thermoplastic composition.

Ultraviolet stabilizers which may be used include any conventionally used UV stabilizers, non-limiting examples of which include substituted resorcinols, salicylates, benzotriazoles, benzophenones, as well as other materials. Generally such UV stabilizing agents comprise 5 weight percent or less of a total thermoplastic composition, preferably they comprise 2.5 weight percent or less of a total thermoplastic composition.

Conventionally used organic dyes and pigments may also be included in the compositions. Examples of such organic dyes and pigments include carbon black, ultramarine blue, dyes based on phthalocyanide, titanium dioxide, cadmium sulfide, cadmium sulfide selenide, nigrosine, as well as others. These conventionally used dyes and pigments may be included to comprise 10 weight percent or less of the total thermoplastic composition, preferably 5 weight percent or less.

Inorganic reinforcing materials as well as fibrous and powdered fillers may be advantageously included in the present inventive compositions. Examples of such conventionally known materials include glass beads or spheres, powdered glass, carbon fibers, glass fibers, asbestos, calcium silicate, calcium metasilicate, aluminum silicate, amorphous silica, fumed silica, magnesium carbonate, kaolin, powdered quartz, chalk, feldspar, and mica. Such reinforcing materials may comprise up to 65 weight percent of the total of the molding compositions, but is preferably 50 weight percent or less of the molding composition.

Further useful additives include nucleation promoters which are known to be useful in conjunction with polyamide compositions. Non-limiting examples of such materials include talc, calcium fluoride, alumina, sodium phenylphosphinate, polytetrafluoroethylene particularly in a finely divided form, as well as others. These conventionally used nucleation promoters may be included to comprise 10 weight percent or less of the total thermoplastic composition within which they are used, and are preferably 5 weight percent or less of the total thermoplastic composition.

Conventionally known plasticizing agents may form a part of the compositions taught herein. By way of example, but not of limitation, such plasticizing agents include dioctyl phthalate, dibenzyl phthalate, butylbenzyl phthalate, hydrocarbon oils, p-tolueneethylsulfonamide, and n-(n-butyl)-bensenesulfonamide, as well as others. The plasticizing agents may be included so to comprise about 35 weight percent or less of the total composition; preferably the plasticizing agents are present in amounts of less than 20 weight percent.

The composition of the present invention may be used for the production of articles formable from thermoplastic materials. By way of example and not of limitation, such articles include sheets, films, rods, tubes, profiled shapes, coatings, parisons for blow molding, as well as others not particularly denoted here. The compositions of the present invention also find particular utility in forming a barrier layer in a rigid molded article such as a flask, or in a flexible molded article such as a container comprising a flexible or semi-rigid structure. Such flexible and/or semi-rigid structures include films, and so called "thin-walled" structures which are plastically deformable but at least partially elastic.

Typically, the composition will be used to form products by injection molding a quantity of the composition which has been previously produced by an extrusion process into pellets, by first heating the preformed pellets to a fluid melt under the action of applied heat, compression and shear effects, and subsequently forcing a quantity of the said melted composition into mold or form where it is allowed to solidify, or in the case where such a composition is used to form a film therefrom, forcing a quantity of the said melted composition through a film die, such as a flat film die or a circular blown film die, and forming a film therefrom. In the case where the composition is used to form a film therefrom, it is contemplated that the films may be unoriented, or may be subjected to a conventional operation to impart a degree of orientation on the film. Such a film may be oriented in one direction, such as in the machine direction, such as in the "machine direction" and/or the "transverse direction", or may be oriented in both directions, or "biaxially" oriented.

The compositions taught in the present specification provide thermoplastic blend compositions which feature good physical properties, i.e., strength, toughness, heat resistance, chemical resistance, etc. which is known to the art as characteristic of non-amorphous polyamides. Particular reference is made here to polyhexamethylene adipamide (nylon 12) and polycaprolactam (nylon 6), as well as copolymers containing one or more of the above. The compositions taught in the present specification additionally feature excellent retention of the modulus of the compositions which are relatively insensitive to increasing levels of moisture. Such properties are especially suited for applications where retention of physical properties, and good gas barrier properties, such as oxygen barrier, aroma barrier, etc. are desired. Uses wherein such characteristics are desirable include in the manufacture of films formed from or comprising the compositions taught herein, as well as articles for the containment of liquids and solids sensitive to moisture or contact with gases or aromas.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

In the following embodiments of the invention, it is to be understood that in the description of any composition, all percentages associated with a constituent used to form a composition are to be understood as to be "percentage by weight" of the particular constituent relative to the composition of which it forms a part. Exceptions to this convention will be particularly noted.

EXAMPLE 1—Production of amorphous polyamide (I)

An amorphous copolymer was produced in accordance with following: there is charged to a reaction kettle 32.2 gm of caprolactam, 1.7 gm aminocaproic acid (which is provided as an additional initiator), 19.9 gm of terepthalic acid ("TPA"), 19.9 gm of isophthalic acid, ("IPA"), and 18.5 gm of phenylindane dicarboxylic acid ("PIDA").

The kettle was sealed and an argon sweep was directed at its contents for 30 minutes, afterwards 40.8 gm of meta-xylylenediamine ("mXDA") was added, and the argon sweep continued for a further period of 15 minutes. The copolyamide produced had the structure:

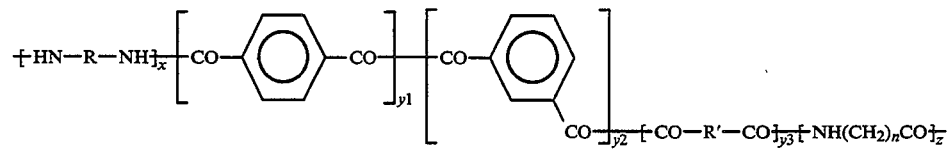

wherein the values of the subscripts were as follows: $x=0.34$, $y1=y2=0.17$, $y3=0$, $z=0.32$, $n=5$, wherein the substituent R had the structure:

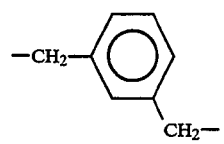

The contents of the kettle was then heated starting at 125° C., and then raised in 25° C. steps to a final temperature of 275° C. The time interval of each period varied between 30 minutes to 2 hours, except for the final period where the heating was continued at 275° C. until the reaction mixture became too viscous to stir or in the alternative, no further change in viscosity was noted. The product produced was transparent, and showed no crystalline endotherm in a DSC analysis.

EXAMPLE 2—Production of amorphous polyamide (II)

To produce an MXDA/IPA/TPA based amorphous polyamide by an interfacial polymerization technique, 3.05 grams of isophthaloyl chloride and 3.05 grams of terephthaloyl chloride were dissolved in 300 ml of ethylene chloride. The resultant solution was placed in a clean, dry addition funnel. In a second flask 4.086 grams of m-xylene diamine and 6.36 grams of sodium carbonate were dissolved in 500 ml of water. The contents of this second flask was a solution which was then transferred to a laboratory blender. The aqueous solution was then agitated, during which the ethylene chloride solution was added in a drop-wise manner. A fluffy white polymer precipitate resulted. This polymer precipitate was filtered, washed, and then dried under vacuum to remove any residual solvents. Total yield was approximately 96% of theoretical yield. The copolyamide produced had the structure:

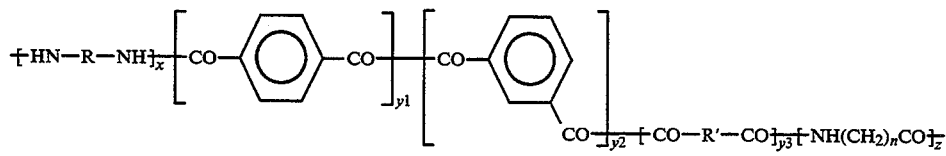

wherein the values of the subscripts were as follows: $x=0.5$, $y1=y2=0.25$, $y3=z=0$, and wherein the substituent R had the structure:

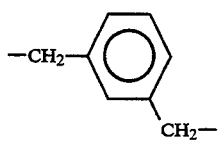

This sample and other like samples prepared in this manner were later determined to have intrinsic viscosities ranging from 0.60 to 0.80. Differential scanning calorimetry of the samples showed that the polymer had a glass transition temperature of about 184° C. No melting peak was observed, indicating that the polymer was amorphous.

EXAMPLE 3—Production of amorphous polyamide (III)

An amorphous polyamide was produced in accordance with a melt polymerization technique using the conditions generally in accordance with Example 1 above. The constituents included meta-xylylenediamine and isophthalic acid. The polyamide produced had the structure:

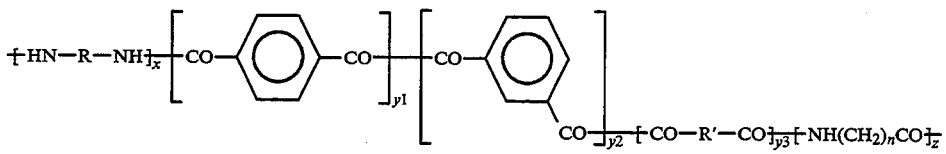

wherein the values of the subscripts were as follows: $x=y2=0.5$; $y1=y3=z=0$, and wherein the substituent R had the structure:

EXAMPLE 4—Production of amorphous polyamide (IV)

An amorphous polyamide was produced in accordance with a solution polymerization technique using the conditions generally in accordance with Example 2 above. The constituents included toluene-2,4-diamine and isophthaloyl chloride. Methylene chloride was used as the solvent, and triethyl amine was used as the base. The polyamide produced had the structure:

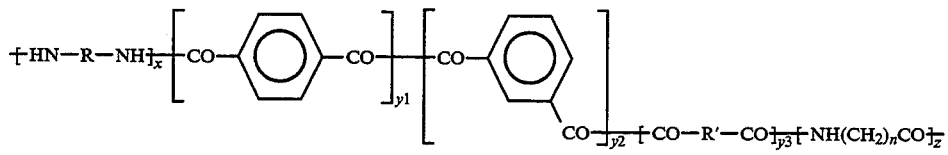

wherein the values of the subscripts were as follows: $x=y1=0.5$; $y2=y3=z=0$, wherein the substituent R had the structure:

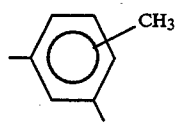

EXAMPLE 5—Production of amorphous polyamide (V)

An amorphous polyamide similar to that produced as Example 4 was produced using the solution polymerization conditions generally in accordance with Example 4 above. The constituents included toluene-2,4-diamine or toluene-2,6-diamine and isophthaloyl chloride. As a further comonomer adipoyl chloride was also provided to the reaction mixture. Methylene chloride was used as the solvent, and triethyl amine was used as the base. The polyamide produced had the structure:

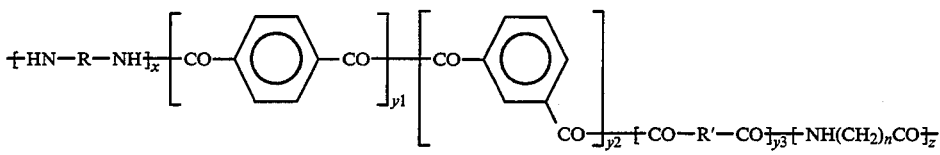

wherein the values of the subscripts were as follows: x=0.5; y2=0.4; y1=0; y3=0.1; z=0, and wherein the substituent R had the structure:

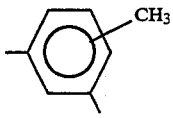

and wherein R' consisted of the following radical:

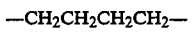

Preparation of Blend Compositions

Compositions according to the present invention's teaching were prepared. As the constituent (A), the conventional polyamide used was Capron ® 8202, a commercially available nylon-6 molding grade homopolymer resin which includes the following physical characteristics: a specific gravity of about 1.13 according to ASTM D-792, a melting point of about 420° F. (215° C.) according to ASTM D-789, a yield tensile strength of approximately 11,500 psi (80 MPa) according to ASTM D-638, an ultimate elongation of about 70% according to ASTM D-638, a flexural strength according to ASTM D-790 of about 15,700 psi (110 MPa), a flexural modulus according to ASTM D-790 of about 410,000 psi (2,825 MPa). As the amorphous polyamide (B), compositions according to Examples I-V were used.

Blended molding compositions were prepared generally in accordance with one the following procedures.

Melt Blending (1)—Single Screw Extruder

To a Killion 1" single screw extruder having a length-:diameter ratio of 30:1 and provided with a general purpose mixing screw were provided a tumble blended mixture of proportional amounts of (A) which had been ground to a powder using a Wiley mill, and proportional amounts of an amorphous polyamide (B) in accordance with Examples 1 through 4. The extruder was operated at 280° C. to plasticate and melt mix the constituents and the extrudate was forced through a coathanger type flat film forming die to form a film having a thickness of approximately 1-2 mils [0.004–0.008 cm] and a width of approximately 6 inches [15.25 cm].

Melt Blending (2)—Twin-Screw Extruder

To a HBI twin screw extruder was provided a tumble blended mixture of proportional amounts of (A) and proportional amounts of an amorphous polyamide (B) in accordance with Examples 1 through 5 and designated as "Amorphous polyamide Type I-V" respectively. The extruder was operated at 280° C. to plastificate and melt mix the constituents and the extrudate was forced through a strand forming die which formed the extrudate into strands of approximately ⅛" diameter which were rapidly quenched in a water bath, and subsequently pelletized.

Solution Blending

To a 500 ml 3-neck round bottom flask fitted with a condenser, mechanical stirrer, nitrogen purge, and heating mantle was charged a proportional amount of (A) and a respective proportional amount of an amorphous copolymer (B) as well as 200 ml of trifluoroethanol. By a "proportional amount" it is to be understood that in the formation of a blend, proportional weights of (A) and (B) were provided, i.e., in a 50%/50% blend equal amounts of (A) and (B) were provided; in a 75%/25% blend, three times as much (A) was provided as (B).

The mixture was stirred for 60 minutes, then heated to reflux and stirred overnight. Afterwards, the mixture was allowed to cool, and then added dropwise into a beaker containing 600 ml of diethylether. A fluffy white precipitate formed, which was subsequently filtered, washed, and dried under vacuum to remove any traces of solvent. Resultant blends were then evaluated using differential scanning calorimetry techniques (DSC).

Physical Properties

Evaluation of the physical properties of the blended molding compositions included standard physical testing according to ASTM D-638 test protocols using standard ⅛" thick ASTM tensile bars. To evaluate the effect of moisture on the tensile yield strength of blended molding compositions, the bars were first tested in their as molded state, and subsequently like samples were conditioned in a 50% relative humidity chamber at approximately 20°-25° C. for a period of 8 weeks, after which the samples were again retested in accordance with ASTM D-638 protocols.

Evaluation of the DSC melting points and glass transition temperature for the various samples was performed using a DuPont 9900 DSC apparatus or a Mettler DSC-30 apparatus. The "wet" Tg measurements were performed on film samples which were pre-equilibrated with water and finely chopped before being placed in a stainless steel DSC sample pan. The pans were then sealed by placing a further stainless steel DSC pan and tightly crimping the DSC pans to so provide a tight seal. Subsequently, the DSC evaluation was performed in a conventional manner using a heating rate of 10° C./minute; the crimped sealed pans ensured that water did not escape from the samples being tested. The moisture content of a respective sample was also independently monitored by thermogravimetric analysis on selective samples; in all other cases a gravimetric method was used to ensure saturated water absorption.

Evaluation of the vapor barrier properties of a respective composition was performed on film samples having a thickness of approximately 1-2 mils [0.004–0.008 cm] produced with the procedure outlined as Melt Blending (1) above. Testing of the film sample was performed using a Permatran MOCON OxTrans analyzer operating in an automatic mode. Results provided report oxygen transmission of the respective sample at a condition of 100% (or 90% as may be particularly denoted) relative humidity ("wet") of cubic centimeters of oxygen transmitted per mil of film for a 100 square inch area of film per day.

Table 1 lists certain physical characteristics of the various amorphous polyamides (B) indicated as Type I–V polyamides in accordance with the present inventive teaching.

TABLE 1

| Amorphous polyamides type: | Amorphous Nylons Tg(deg. C.) | | Oxygen Permeability: | |
|---|---|---|---|---|
| | "dry" | "wet" | "dry" | "wet" |
| I | 125 | 50(54) | 1.3 | 0.2 |
| II | 190 | — | — | — |
| III | 170 | 68 | 0.5 | 0.1 |
| IV | 270 | 137 | — | — |
| V | 238 | 128 | — | — |

"wet" Tg values at 100% relative humidity
Oxygen Permeability reported as (cc oxygen per mil thickness/100 sq. inches/day
Tg values indicate DSC onset and (mid-point) values Test results are indicated on Tables 2 and 3 following; Table 2 lists particular physical properties of blend molding compositions which comprised the polyamide (A) and the Type I amorphous polyamide (B) according to Example 1.

Table 2 lists a series of compositions of which "C1" is a comparative example consisting essentially of the polyamide (A) only. Example C1 consists essentially of Capron® 8202. The physical characteristics of this compound have been described in detail above. Blend compositions according to the present invention which were formed into films having a thickness of 1–2 mils as described above. As should be readily apparent from the results, the addition of even minor amounts of the amorphous polyamide (B) to blend compositions comprising (A) and (B) are shown to provide significant improvements in the "wet" glass transition temperatures and oxygen permeability of the blends as compared to the conventional polyamide (A). All of the compositions of Examples 1–7 were first formed by melt blending (A) and (B) in a twin screw extruder, pelletizing the extrudate, which pellets were subsequently used to form films.

TABLE 3

| Nylon 6/66 (85/15) copolymer/Amorphous Nylon Blends | | | | |
|---|---|---|---|---|
| Example: | Amorphous polyamides type: | Blend Ratio (A):(B) | Oxygen Permeability: | |
| | | | "dry" | "wet" |
| C3 | — | 100:0 | 3.3 | 21.6 |
| 8 | I | 75:25 | 2.5 | 8.8 |
| 9 | I | 60:40 | 2.8 | 6.2 |
| 10 | I | 50:50 | 2.2 | 4.6 |
| 11 | I | 25:75 | 1.7 | 4.2 |

"wet" Tg values at 100% relative humidity
Oxygen Permeability reported as (cc oxygen per mil thickness/100 sq. inches/day)

Table 3 lists glass transition temperatures of blend molding compositions comprising a different polyamide (A) and the Type I amorphous polyamide (B). The polyamide (A1) of Table 3 is a nylon 6/66 polyamide having a weight ratio of nylon 6:nylon 66 segments of 85 wt %:15 wt. %. This nylon 6/66 polyamide is presently commercially available from Allied Signal Corp., Morristown, N.J. USA under the trade designation of "XPN-1539" or alternately in a film as "Capron® Extraform®".

The compositions of Table 3 provide a comparative example "C3" which consists essentially of the nylon 6/66 polyamide, and further blend compositions according to the invention which are presented as numbered Examples 8–11. All of the example compositions according to Table 2 were formed into films having a thickness of 1–2 mils in accordance with the protocol outlined above. Of particular note regarding the reported data is that each of the blend samples tested provided a single glass transition temperature in both "dry" and in "wet" (100% relative humidity) test conditions indicating the miscibility of both polyamides (A1) and (B) within the blend composition.

As may be seen from Table 3, the addition of even minor proportions of (B) to the blend compositions comprising (A1) and (B) provides significant improvement in the oxygen barrier characteristics of the samples.

Shown on Table 4 are physical test results of further Example blend compositions numbered 12 and 13 according to the present invention, and a Comparative Example "C1" which,consists essentially of Capron® 8202, constituent (A), which was described above. The compositions were formed into standard ⅛ inch testing bars and subjected to evaluation under "dry" and "wet" conditions. As may be seen from the reported results on Table 4, the blend compositions show improved retention of yield strength when subjected to the adverse environmental condition of 100% humidity.

TABLE 2

| Nylon 6/Amorphous Nylon Blends | | | | | | |
|---|---|---|---|---|---|---|
| Example | Amorphous polyamides type: | Blend Ratio (A):(B) | Tg (deg. C.) | | Oxygen Permeability: | |
| | | | "dry" | "wet" | "dry" | "wet" |
| C1 | — | 100:0 | 45(50) | −15 | 2.85 | 14.8 |
| 1 | I | 80:20 | 57 | — | 2.56 | 2.1* |
| 2 | I | 75:25 | — | 3 | — | — |
| 3 | I | 70:30 | 81 | — | 2.3 | 6.17 |
| 4 | I | 50:50 | 79(85) | 19(30) | 1.97 | 2.6 |
| 5 | I | 40:60 | 94 | — | 1.9 | 0.36* |
| 6 | I | 30:70 | — | — | 1.58 | 3.27 |
| 7 | I | 15:85 | 110 | 34(40) | — | — |

"wet" Tg values at 100% relative humidity
Oxygen Permeability reported as (cc oxygen per mil thickness/100 sq. inches/day)
Oxygen Permeability "wet" values with * are at 90% relative humidity; all others at 100% relative humidity
Tg values Indicate DSC onset and (mid-point) values

TABLE 4

| | | Nylon 6/Amorphous Nylon Blends | | | |
|---|---|---|---|---|---|
| | Amorphous | Blend:Ratio | Yield Strength, kpsi [kPa] | | |
| Example | polyamides type: | (A):(B) | "dry" | "wet" | Yld. Str. Retention |
| C1 | — | 100:0 | 11.1 [5202] | 7.7 [3609] | 69% |
| 12 | I | 75:25 | 12.4 [5812] | 9.6 [4500] | 77% |
| 13 | I | 50:50 | 13.9 [6515] | 13.6 [6375] | 98% |

"wet" Tg values at 100% relative humidity

Table 5 illustrates further Example compositions 14–24 of various blends of a conventional polyamide (A) which is Capron® 8202, and different amorphous polyamides (B) of Types II, III, IV, and V described above forming blend compositions according to the present invention. The compositions of Examples 14–17, and Examples 21–24 were formed by a the Solution Blending technique previously described which were then extruded into films; the compositions of Examples 18–20 were formed by melt blending (A) and (B) in a twin screw extruder, pelletizing the extrudate, which pellets were subsequently used to form films. The films of Examples 14–24 had thicknesses of 1–2 mils.

TABLE 5

| | | Nylon 6/Amorphous Nylon Blends | | | | |
|---|---|---|---|---|---|---|
| | Amorphous | Blend Ratio | Tg (deg. C.) | | Oxygen Permeability: | |
| Example | polyamides type: | (A):(B) | "dry" | "wet" | "dry" | "wet" |
| C1 | — | 100:0 | 45(50) | −15 | 2.85 | 14.8 |
| 14 | II | 90:10 | 70 | −19 | — | — |
| 15 | II | 80:20 | — | 16 | — | — |
| 16 | II | 70:30 | 105 | — | — | — |
| 17 | II | 50:50 | 130 | — | — | — |
| 18 | III | 70:30 | 65 | 52 | 1.46 | 6.06 |
| 19 | III | 50:50 | 77 | 44* | 2.17 | 3.74 |
| 20 | III | 30:70 | 114 | 48 | 1.4 | 1.8 |
| 21 | IV | 80:20 | 88 | — | — | — |
| 22 | IV | 60:40 | 105 | — | — | — |
| 23 | V | 70:30 | 82 | 54 | — | — |
| 24 | V | 50:50 | 118 | 50.8 | — | — |

*a minor transition was also noted at −9.7 deg. C.
Oxygen Permeability reported as (cc oxygen per mil thickness/100 sq. inches/day)

As the results of Table 5 illustrate, the inclusion of even minor amounts of the amorphous polyamides (B) into blend compositions provided significant improvements in the "dry" glass transition temperatures, and in the examples shown, in the "wet" glass transition temperatures as well. Further, the reported values of oxygen permeability again as compared to the Comparative Example C1 illustrates a significant improvement in barrier properties under both "dry" and "wet" conditions.

It will be appreciated that the instant specifications and examples set forth herein are by way of illustration and not limitation, and that various modifications and changes may be made without departing from the spirit and scope of the present invention, whose limitations are bounded only by the appendant claims.

What is claimed is:

1. A thermoplastic polymeric blend composition comprising:
   (A) a first polyamide which is one or more aliphatic or cycloaliphatic polyamides selected from the group consisting of: polyamides obtained by the polymerization of equimolar proportions of a diamine having two or more carbon atoms between the amine terminal groups with a dicarboxylic acid a polyamide obtained by the polymerization of a monoamino carboxylic acid or an internal lactam thereof with an equimolar proportion of a diamine and a dicarboxylic acid, and a polyamide derived by the condensation of a monoaminocarboxylic acid or an internal lactam thereof having at least two carbon atoms between the amino and the carboxylic acid groups; and
   (B) a second amorphous polyamide which is polymerized from
      ($B_1$) a polyamide forming monomer selected from the group consisting of lactams, aminoalkanoic acids and combinations thereof, wherein the monomer is present in a molar proportion of about 0 to 50%,
      ($B_2$) a diamine selected from the group consisting of di(aminoalkyl)benzenes, di(aminoalkyl)halobenzenes, di(amino)alkylbenzenes, di(alkylaminobenzenes), cycloalkylene diamines and combinations thereof, the diamine being present in a molar proportion of about 25 to 60%,
      ($B_3$) at least one aromatic dicarboxylic acid, the aromatic dicarboxylic acid being present in a molar proportion of about 25 to 60% wherein (A) and (B) are substantially miscible when formed into a blend composition.

2. The blend composition according to claim 1 wherein:
   the blend composition further comprises at least one additive or processing aid (C) selected from the group consisting of: heat stabilizers, processing agents, lubricants, mold release agents, ultraviolet stabilizers, organic dyes, pigments, inorganic reinforcing materials, and plasticizing agents.

3. The blend composition according to claim 1 wherein:
   the amorphous polyamide (B) exhibits a higher glass transition temperature than the polyamide (A).

4. The blend composition according to claim 1 wherein:
   the blend composition comprises up to about 35% by weight of the amorphous copolyamide (B).

5. The blend composition according to claim 1 wherein:
the blend composition exhibits higher barrier properties at 100% humidity as compared to the barrier property of the polyamide (A) at 100% humidity.

6. A thermoplastic polymeric blend composition comprising:
(A) a first polyamide which is one or more aliphatic or cycloaliphatic polyamides selected from the group consisting of: polyamides obtained by the polymerization of equimolar proportions of a diamine having two or more carbon atoms between the amine terminal groups with a dicarboxylic acid, a polyamide obtained by the polymerization of a monoamino carboxylic acid or an internal lactam thereof with an equimolar proportion of a diamine and a dicarboxylic acid, and a polyamide derived by the condensation of a monoaminocarboxylic acid or an internal lactam thereof having at least two carbon atoms between the amino and the carboxylic acid groups, and
(B) a second amorphous copolyamide which is represented by the following formula:

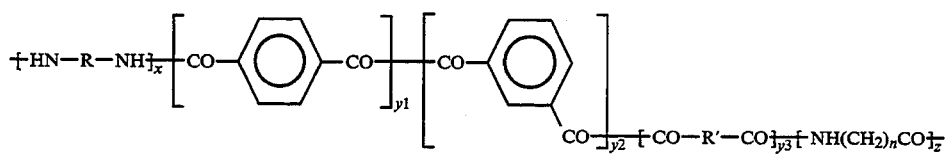

wherein:

$$x+y1+y2+y3+z=1$$

and, $$y1+y2+y3=x$$

wherein n has a value of 5–11, and $z=0$–$0.5$ and wherein R is selected from the group consisting of:

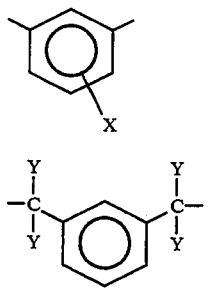

wherein X is
selected from the group consisting of —CH$_3$—, an n-alkyl group, and halides,
Y is selected from the group consisting of H and —CH$_3$—, and
R$^1$ is an α,ω-alkylene radical containing 4 to 18 carbon atoms wherein (A) and (B) are substantially miscible when formed into a blend composition.

7. The blend composition according to claim 6 wherein the α,ω-alkylene radical containing 4 to 18 carbon atoms represented by R' is derived from adipic acid, azelaic acid, sebacic acid or dodecanedioic acid.

8. A thermoplastic molding composition comprising the blend composition according to claim 1.

9. A film formed from the blend composition according to claim 1.

10. An article having improved barrier characteristics comprising at least one layer formed from the blend composition according to claim 1.

11. A thermoplastic polymeric composition comprising:
(A) a first polyamide which is one or more aliphatic or cycloaliphatic polyamides selected from the group consisting of: polyamides obtained by the polymerization of equimolar proportions of a diamine having two or more carbon atoms between the amine terminal groups with a dicarboxylic acid, a polyamide obtained by the polymerization of a monoamino carboxylic acid or an internal lactam thereof with an equimolar proportion of a diamine and a dicarboxylic acid, and a polyamide derived by the condensation of a monoaminocarboxylic acid or an internal lactam thereof having at least two carbon atoms between the amino and the carboxylic acid groups;
(B) an amorphous second polyamide structurally different from said first polyamide, wherein said second polyamide comprises recurring monomeric units of the formulae:
(B$_1$) {—N(H)—R$_1$—C(O)—}; and
(B$_2$) {—N(H)—R$_2$—N(H)—};
{—C(O)—(R$_3$)$_q$—C(O)—};
wherein:
R$_1$ is selected from the group consisting of alkylene, alkylarylene, and arylene;
R$_2$ is selected from the group consisting of substituted or unsubstituted dialkylenearylene, arylene, cycloalkylene, and cycloalkylenearylene, wherein substituents are alkyl or halo;
R$_3$ is selected from the group consisting of arylene and dialkylenearylene; and
q is 1;
and wherein the monomers (B$_1$), (B$_2$), and (B$_3$) are present in a molar proportion, (B$_1$):(B$_2$):(B$_3$), of about 0–50%:25–60%:25–60%, based on the total number of moles of amorphous polyamide B, with the total number of moles of (B$_1$)+(B$_2$)+(B$_3$)=100% wherein (A) and (B) are substantially miscible when formed into a blend composition.

12. A thermoplastic polymeric composition as recited in claim 11, wherein the monomer (B$_1$) is caprolactam.

13. A thermoplastic polymeric composition as recited in claim 11, wherein the monomer (B$_2$) is selected from the group consisting of m-xylylene diamine and p-xylylene diamine.

14. A thermoplastic polymeric composition as recited in claim 11, wherein the monomer (B$_3$) is selected from the group consisting of terephthalic acid and isophthalic acid.

15. A thermoplastic polymeric composition as recited in claim 11, wherein the monomers ($B_1$), ($B_2$), and ($B_3$) are present in a molar proportion, ($B_1$): ($B_2$): ($B_3$), of about 30–40%:30–40%:30–40%, based on the total number of moles of amorphouspolyamide B, and wherein the number of moles of ($B_1$)+($B_2$)+($B_3$)=100%.

16. A thermoplastic polymeric composition as recited in claim 11, wherein said composition comprises about 50–95% of polyamide A and about 5–50% of polyamide B.

17. A thermoplastic polymeric composition as recited in claim 11, wherein polyamide B has a $T_g$ of at least 100° C., measured at a relative humidity of less than 25%.

18. A thermoplastic polymeric composition as recited in claim 11, wherein polyamide B has a $T_g$ of at least 25° C., measured at a relative humidity of 100%.

19. A thermoplastic polymeric composition as recited in claim 11, wherein polyamide A is selected from the group consisting of polycaprolactam, polyhexamethylene adipamide, and copolymers thereof.

20. A film formed from the thermoplastic polymeric composition according to claim 11, wherein said film has an oxygen permeability, measured at a relative humidity of greater than 90%, of less than or equal to 8.8 cc of oxygen per mil thickness per 100 square inches per day.

21. A thermoplastic polymeric composition as recited in claim 11, wherein a blend of said polyamide A and said amorphous polyamide B are sufficiently miscible such that said blend exhibits a single $T_g$.

22. A thermoplastic polymeric composition as claimed in claim 6, wherein X is —Cl.

23. A thermoplastic polymeric composition as claimed in claim 6, wherein Y is —$CH_3$.

24. A thermoplastic polymeric composition as claimed in claim 6, wherein R' is selected from the group consisting of adipic acid, azelaic acid, sebacic acid and dodecanedioic acid.

25. A thermoplastic polymeric composition as claimed in claim 6, wherein n=5.

* * * * *